UNITED STATES PATENT OFFICE.

EMLEN G. PENROSE, HARVEY S. NUTTING, AND WILLIAM H. SMITH, OF TAMA, IOWA.

FIRE-EXTINGUISHING COMPOUND.

SPECIFICATION forming part of Letters Patent No. 387,915, dated August 14, 1888.

Application filed October 28, 1887. Serial No. 253,626. (No specimens.)

*To all whom it may concern:*

Be it known that we, EMLEN G. PENROSE, HARVEY S. NUTTING, and WILLIAM H. SMITH, citizens of the United States of America, residing at Tama, in the county of Tama and State of Iowa, have invented certain new and useful Improvements in Fire-Extinguishing Compounds, of which the following is a specification.

Our invention pertains to an improvement in compounds for hand-grenades for extinguishing fire.

In the preparation of our compound we employ two parts of saleratus or carbonate of potash, one part of saltpeter, two parts of salt, one part of sulphate of iron, and one part of alum. These ingredients we put into an air-tight cask and dissolve together, and after the mixture has thus been in solution and digested we draw therefrom into bottles or any other convenient receptacle for conveying it to the fire—the clear liquid, which we hermetically seal up, thus fully preparing the compound as an article of commerce.

We claim as our invention—

The herein-described fire-extinguishing compound, composed of two parts saleratus, one part saltpeter, two parts salt, one part sulphate of iron, and one part alum, as stated.

In testimony whereof we affix our signatures in presence of two witnesses.

EMLEN G. PENROSE.
HARVEY S. NUTTING.
WILLIAM H. SMITH.

Witnesses:
CHAS. HOMAN,
L. SMITH.